United States Patent [19]

Okamura

[11] Patent Number: 5,532,885
[45] Date of Patent: Jul. 2, 1996

[54] MAGNETIC RECORDING/REPRODUCING APPARATUS HAVING INTEGRATED CIRCUIT FOR HOLDING LOW FREQUENCY FULL WAVE RECTIFIED SIGNAL

[75] Inventor: Hiroshi Okamura, Tokyo, Japan

[73] Assignee: Kabushiki Kaisha Toshiba, Kanagawa-ken, Japan

[21] Appl. No.: 319,879

[22] Filed: Oct. 7, 1994

[30]  Foreign Application Priority Data

Oct. 8, 1993 [JP] Japan ................... 5-253217

[51] Int. Cl.[6] ............................. G11B 5/09; G11B 15/12
[52] U.S. Cl. ................... 360/46; 360/53; 360/62
[58] Field of Search ................... 360/46, 62, 69, 360/39, 53

[56]  References Cited

U.S. PATENT DOCUMENTS 4,495,528  1/1985  Sasamura et al. .................. 360/46

Primary Examiner—W. Chris Kim
Attorney, Agent, or Firm—Ronald L. Yin; Limbach & Limbach

[57]  ABSTRACT

A magnetic recording/reproducing apparatus for reproducing data recorded on a recording medium based on the signal read by a head contains a filter circuit which restricts the frequency range of the read signal and allows the low frequency read signal to pass through it, a full wave rectification circuit for full wave rectification of the read signal output from this filter circuit and an integrating circuit for generating a threshold signal of the read signal output from the filter circuit based on the integrated value obtained by integrating the output signal from the full wave rectification circuit when reproducing data and for holding the integrated value at the time of the immediately before data reproduction during the operation other than the data reproducing operation. Further, the apparatus contains a binarization circuit for generating read data pulses based on the threshold signal output from the integrating circuit and a differentiated signal obtained by differentiating the read signal output from the filter circuit.

11 Claims, 6 Drawing Sheets

RS
OUTPUT OF LPF 4

WG

+V
TH
BIAS VOLTAGE
t

RS
OUTPUT OF LPF 4

WG

+V
TH
0
HOLDING
t

MAGNETIC RECORDING/REPRODUCING APPARATUS HAVING INTEGRATED CIRCUIT FOR HOLDING LOW FREQUENCY FULL WAVE RECTIFIED SIGNAL

BACKGROUND OF THE INVENTION

1. Field of the Invention

The present invention relates to a magnetic recording/reproducing apparatus and, more particularly, to an improvement of a data reproducing circuit incorporated in this magnetic recording/reproducing apparatus.

2. Description of the Related Art

A conventional magnetic recording/reproducing apparatus such, as a hard disc drive (HDD), etc. is provided with a data reproducing circuit for reproducing data from signals read from a recording medium by a magnetic head. This data reproducing circuit generates read data pulses including clock pulses from signals read by the magnetic head. The data reproducing circuit further includes a separator circuit which separates data pulses, and a decoder circuit which decodes the data pulses to reproduced data.

A data reproducing circuit as shown in FIG. 1 is known as a circuit for generating a read data pulse RD. That is, a signal read from a recording medium 10 by a head 1 is amplified by a pre-amplifier 2. The amplified read signal is further amplified to a fixed level by an AGC (Automatic Gain Control) amplifier 3. The frequency range of the output signal from the AGC amplifier 3 is restricted by a low pass filter (LPF) 4. A low frequency components of the output signal from the AGC amplifier 3 only passes through the LPF 4 and is input to a binarization circuit 5.

The output signal from the LPF 4 is also input to a full wave rectification circuit 6. The full wave rectification circuit 6 rectifies the full wave of signal read from the LPF 4. The full wave rectified output signal FWR is input to an AGC signal generator 7 and an integrating circuit 8, The integrating circuit 8 includes a capacitor and smoothes the rectified output signal FWR. The AGC signal generator 7 generates an AGC signal by comparing the FWR signal with a reference signal and sends the AGC signal to the AGC amplifier 3 so that the output of the AGC amplifier 3 is kept at a fixed voltage level.

The integrating circuit 8 generates a threshold signal TH required for the operation of the binarization circuit 5 by integrating the full wave rectified signal FWR, The binarization circuit 5 has a differentiating circuit (not shown) for differentiating the output signal RS from the LPF 4 and a window generating circuit (not shown) for generating a window by a threshold signal TH. The window generating circuit compares the level of the output signal RS from the LPF 4 with that of the threshold signal TH and generates window pulses having duration equivalent to a period when the level of the signal RS is higher than the level of the threshold signal (+TH or is lower than the level of an inverted threshold signal −TH).

The binarization circuit 5 has a pulse generating circuit (not shown) having a comparator for detecting the zero crossing point of differentiated signal from the differentiating circuit. This pulse generating circuit reads data pulses RD, synchronizing with the zero crossing point of the differentiated signal, if the zero cross point is detected by the comparator when the window pulses exist.

At the time of the data recording (writing), the head 1 executes the write operation on a recording medium (disc) according to write data. Therefore, there is no read signal from the head 1 and the output from the pre-amplifier 2 will become zero. At this time, the AGC signal generator 7 fixes (holds) the gain of the AGC amplifier 3 according to a write gate signal (a write control signal) WG that is output from an HDD controller 9 to prevent increase of gain. The controller 9 generates the WG signal when a host system, such as a personal computer, sends a write command to the controller.

However, the integrating circuit 8 keep functioning at the time of the writing. As shown in FIG. 2, there is no RS signal from LPF 4 during the write operation (i.e. when the signal WG is ON). If the period of the write operation is relatively long, the voltage of the output signal TH of the integrating circuit 6 will drop to the bias voltage level. Accordingly, when the write operation is completed and the reproducing operation again begins, a time based on the time constant of the integrating circuit 8 is required for the voltage level of the signal TH to go up to a prescribed value (i.e. a full charging level of the capacitor). In other words, immediately after the write operation has shifted to the reproducing operation, the integrating circuit 8 starts the integrating operation at a low voltage. There may be a long delay to obtain the proper level of the threshold signal TH.

The normal threshold signal TH may not be output in some cases when the data reproducing operation is started immediately after the write operation. Therefore, when a read signal is turned to pulses using the low voltage level threshold signal TH in the binarization circuit 5, false pulses are generated and the possibility for generating data error becomes high.

To solve these defects, it is considered to make a time constant of the integrating circuit 8 small. However, even when a time constant is made small, the level of threshold signal TH is fluctuated by noises and the operation of the binarization circuit 5 becomes unstable.

SUMMARY OF THE INVENTION

It is an object of the present invention to provide a magnetic recording/reproducing apparatus which outputs a threshold signal of a proper level required for the operation of the binarization circuit stably and executes the data reproducing operation without generating data error when, for instance, executing the data reproducing operation immediately after the apparatus is in an operational mode where no signal is read by a head.

According to the present invention there is provided a magnetic recording/reproducing apparatus for reproducing data recorded on a recording medium based on a signal read by a head, comprising filter means for restricting the frequency range of a read signal and allowing the low frequency read signal to pass through it; full wave rectifying means for rectifying the full wave of the read signal that is output through the filter means; integrating means for generating a threshold signal of the read signal output through the filter means based on an integrated value obtained by integrating the output signal from the full wave rectifying means when reproducing data and for holding the integrated value at the time of the immediately before data reproducing during the operation other than the data reproducing operation; and binarization means for generating read data pulses based on the threshold signal output from the integrating means and the integrated signal obtained by integrating the read signal output from the filter means.

Further, according to the present invention there is provided a data reproducing method of the magnetic recording/ reproducing apparatus for reproducing data recorded on a recording medium based on the read signal read by a head, the method comprising the steps of: restricting the frequency range of read signal and extracting the low frequency read signal; rectifying the extracted read signal and outputting the full wave rectified signal; generating a threshold signal based on an integrated value obtained by integrating the full wave rectified signal in producing data and holding an immediately before integrated value during the operation other than the data reproducing operation; differentiating the extracted read signal and outputting the differentiated signal; and generating read data pulses based on the threshold signal and the differentiated signal.

DETAILED DESCRIPTION OF THE PREFERRED EMBODIMENT

An embodiment of the present invention will now be described with reference to the drawings.

Figure 3:
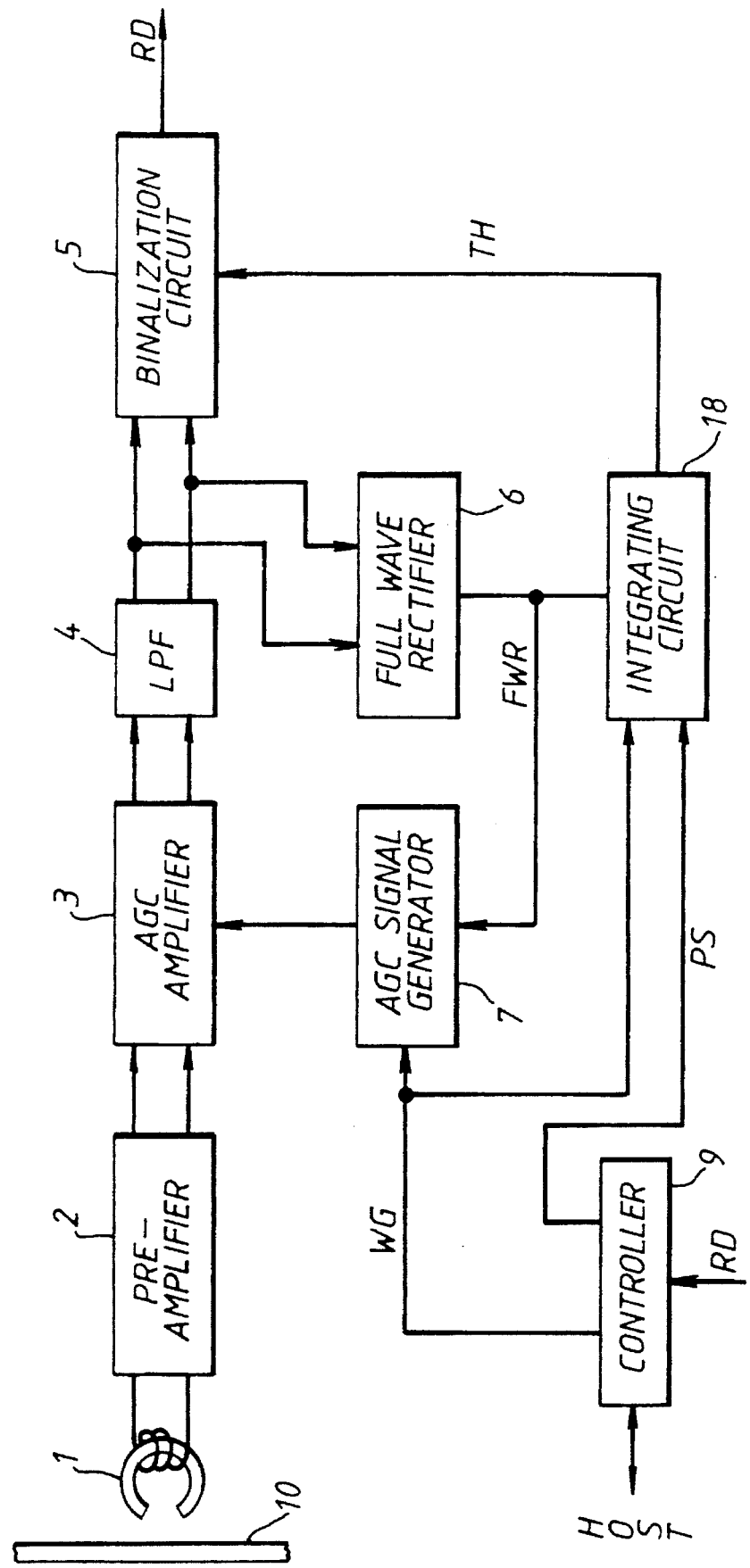
FIG. 3 is a block diagram showing the essential parts of the data reproducing circuit as an embodiment of a magnetic recording/reproducing apparatus of the present invention.

In the data reproducing circuit shown in FIG. 3, an integrating circuit 18 holds an integrated value (at the voltage level) obtained by integrating the output signal from the full wave rectification circuit immediately before by the write gate signal WG or the power save signal PS from an HDC (Hard Disc Controller) 9 which includes a microprocessor or CPU (not shown), and a read only memory (not shown) storing programs controlling the microprocessor. The power save signal PS is normally a control signal for saving power consumption in the non read/write operation of the HDD and is output from, for instance, the CPU (the control circuit) of the HDD according to a command from a host computer.

Figure 4:
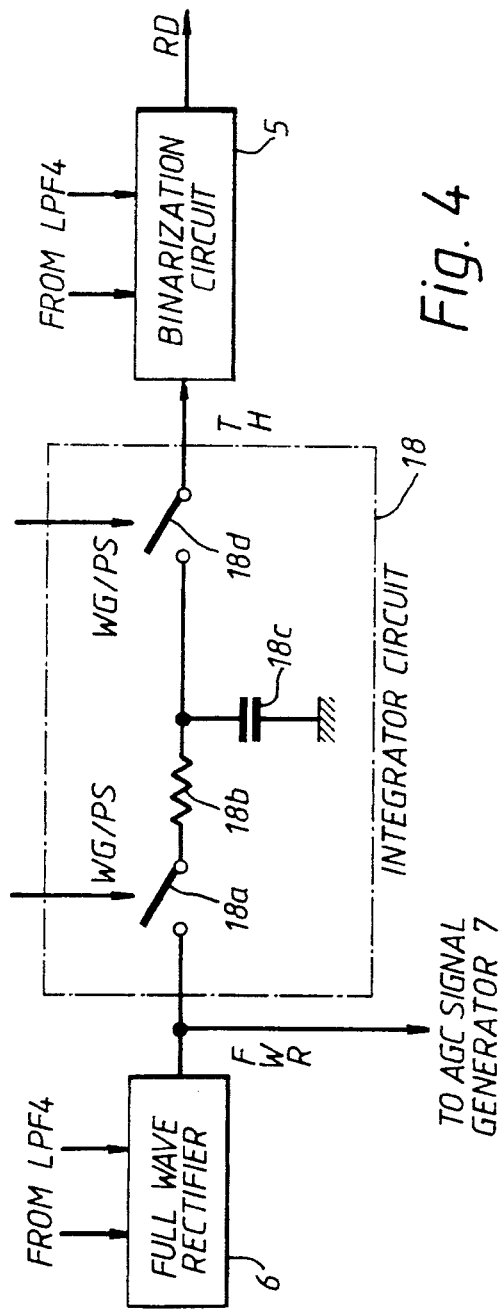
FIG. 4 is a block diagram showing the construction of an integrating circuit of the data reproducing circuit shown in FIG. 3.

As shown in FIG. 4, the integrating circuit 18 comprises switch elements 18a and 18d, which are turned OFF if the write gate signal WG or the power save signal PS is a significant signal, and a resistor 18b and a capacitor 18c which specify an integral time constant.

Figure 5:
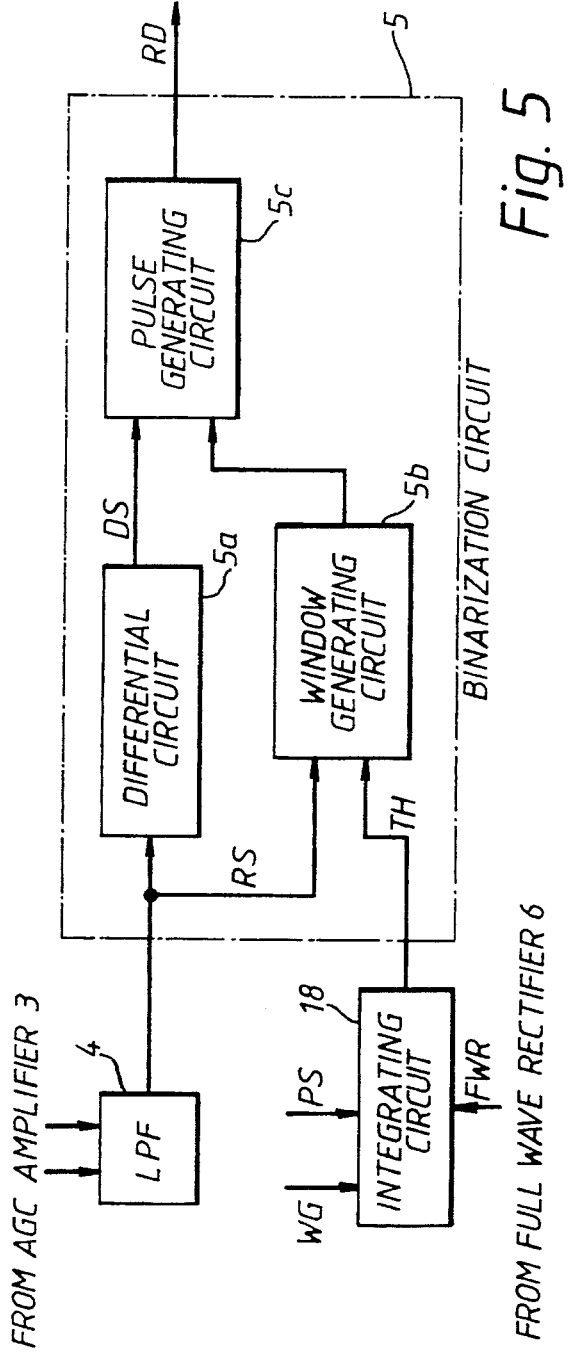
FIG. 5 is a block diagram showing the construction of a binarization circuit of the data reproducing circuit shown in FIG. 3.

As shown in FIG. 5, the binarization circuit 5 comprises a differentiating circuit 5a, a window generating circuit 5b and a pulse generating circuit 5c. The output signal RS from the LPF 4 is input to the differentiating circuit 5a, and the differentiated signal DS is output therefrom. The window generating circuit 5b compares the level of the output signal RS from the LPF 4 with those of the threshold signal TH from the integrating circuit 18 or the inverted signal thereof (–TH) and generates a window pulse (refer FIGS. 7a and 7b) while the level of the output signal RS is higher than the level of the threshold signal +TH and is lower than the inverted threshold signal –TH. The pulse generating circuit 5c outputs a pulse as a read data pulse RD when the window pulse exists, which is synchronous with the zero crossing point of the differentiated signal DS.

Figure 1:
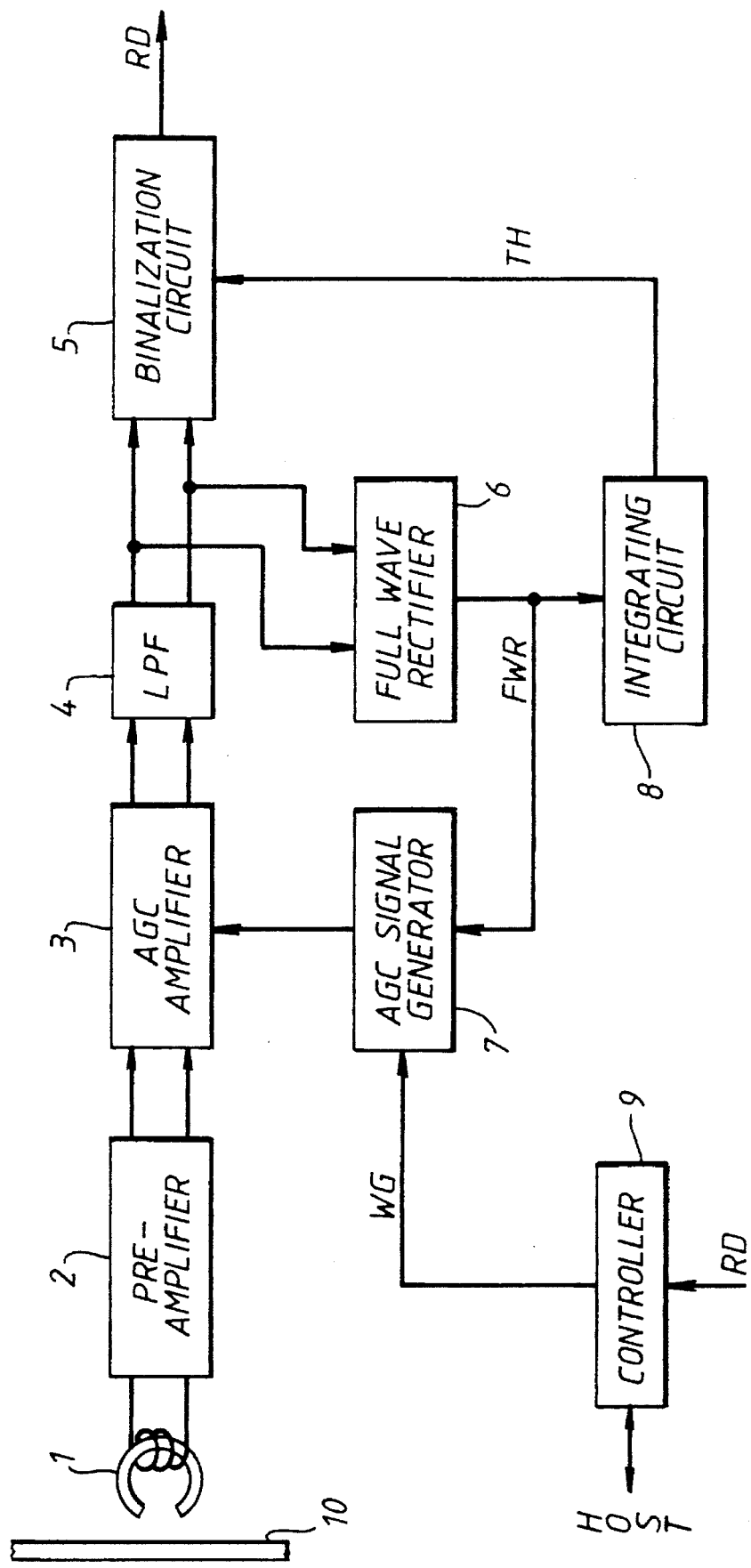
FIG. 1 is a block diagram showing the essential parts of the data reproducing circuit of a conventional magnetic recording/reproducing apparatus.
Figure 2A:
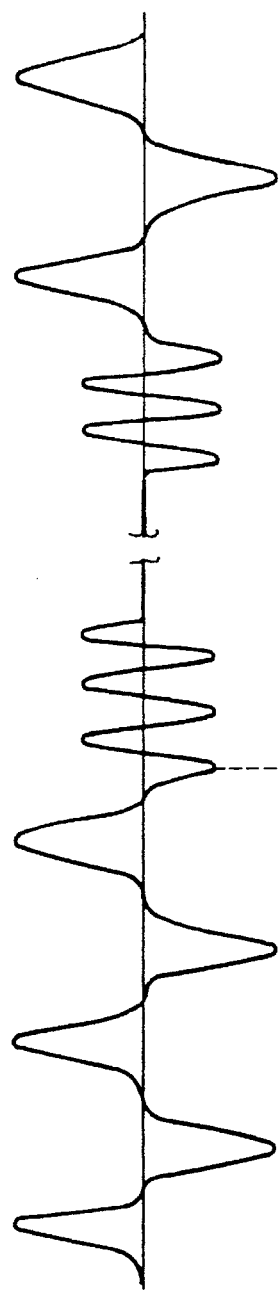
FIGS. 2a, 2b and 2c are timing charts for explaining the operation of the data reproducing circuit shown in FIG. 1.
Figure 2B:
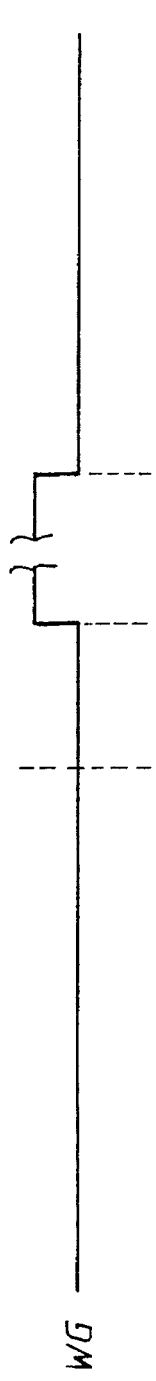
Figure 2C:
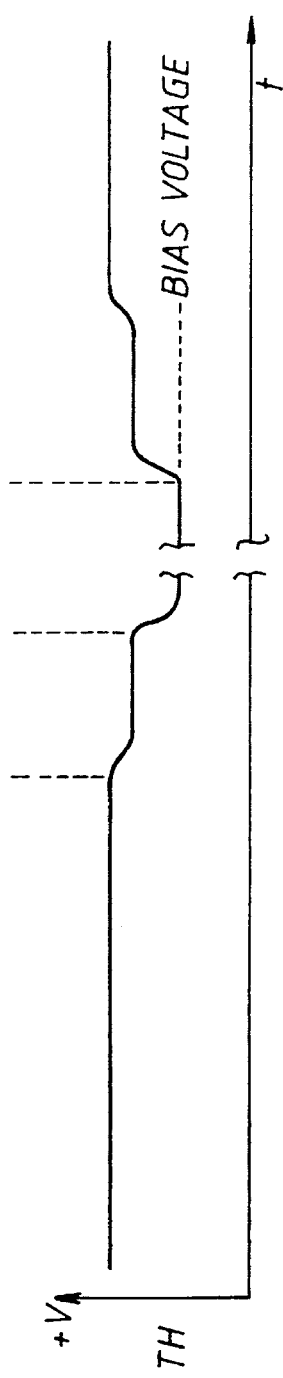

Other components are identical to those shown in FIG. 1 and therefore, the same reference numerals or letters are assigned to them and their explanations will be omitted.

Next, the operation of this embodiment will now be described.

First, in the data reproduction, the read signal output from the head 1 is amplified by the pre-amplifier 2 and is further amplified to a fixed level by the AGC amplifier 3. The higher frequency range of the output signal from the AGC amplifier 3 is restricted by the LPF 4 and the low frequency signal RS only passes through the LPF 4 and is input to the binarization circuit 5.

The output signal RS from the LPF 4 is also input to the full wave rectification circuit 6. The full wave rectification circuit 7 performs the full wave rectification of the read signal RS from the LPF 4 and its output signal FWR is input to the AGC signal generator 7 and the integrating circuit 18. The AGC signal generator 7 generating an AGC signal by comparing the FWR signal with a reference signal so that the output level of the AGC amplifier 3 will become constant.

Figure 7A:
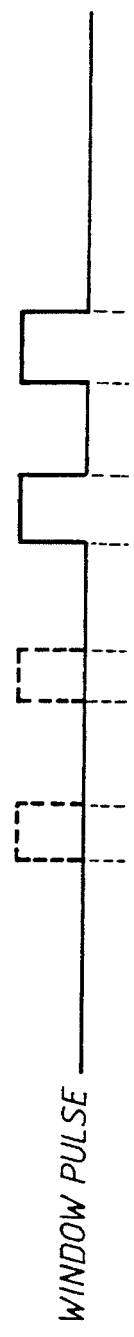
FIGS. 7a, 7b, 7c and 7d are timing charts for explaining the operation of the data reproducing circuit shown in FIG. 3.
Figure 7B:
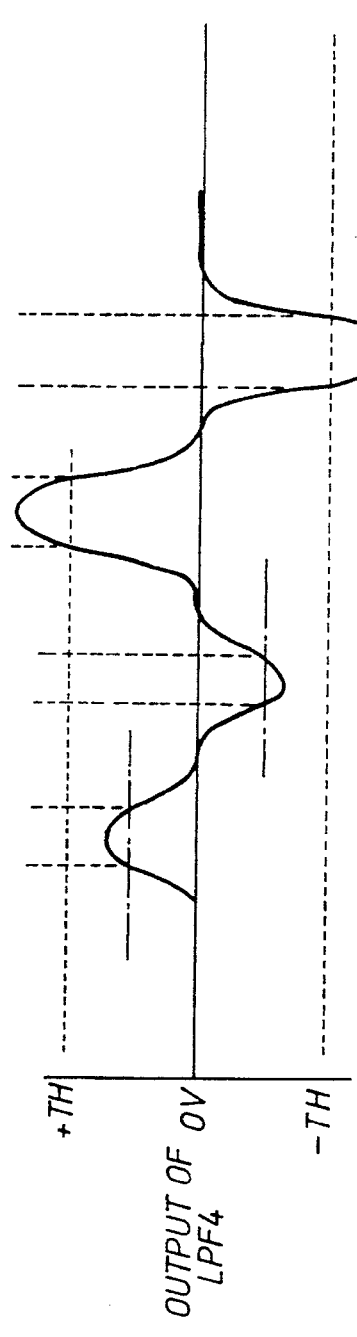

The integrating circuit 18 generates the threshold signal TH that is needed for the operation of the binarization circuit 5 by smoothing the full wave rectified signal FWR. The window generating circuit 5b of the binarization circuit 5 compares the level of the output signal RS from the LPF 4 with that of the threshold signal TH from the integrating circuit 18 and the inverted signal thereof (–TH) to generate a window pulse as shown in FIGS. 7a and 7b.

Figure 7C:
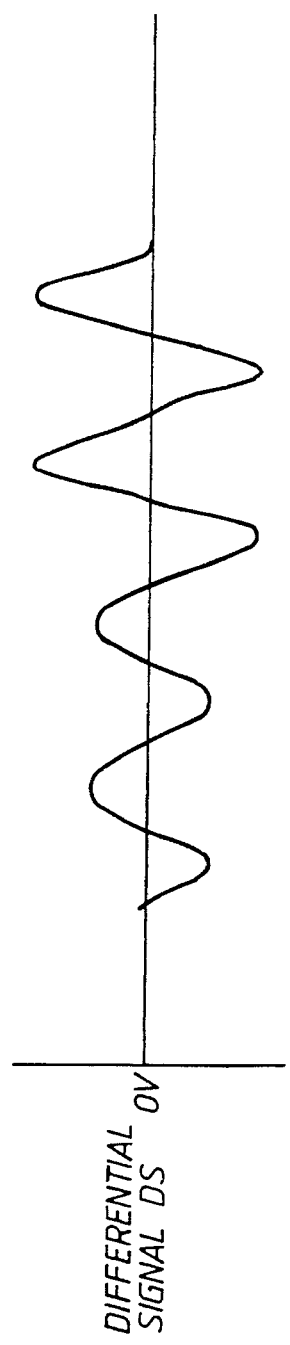
Figure 7D:
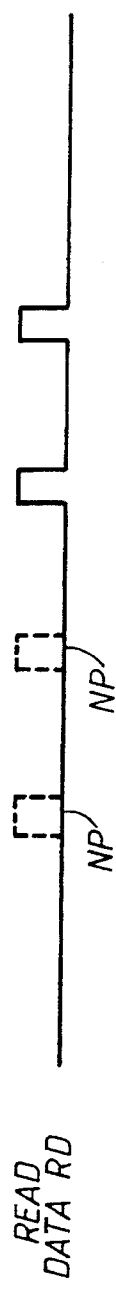

The differentiating circuit 5a differentiates the output signal RS from the LPF 4 and outputs the differentiated signal DS as shown in FIG. 7c. The pulse generating circuit 5c outputs a pulse as a read data pulse RD that is synchronous with the zero crossing point of the differentiated signal DS when the window pulse exists as shown in FIGS. 7a, 7c and 7d.

In this embodiment, when the data reproducing operation is shifted to the write operation and the write gate signal WG is output from the HDC, the switch elements 18a and 18d of the integrating circuit 18 are turned OFF. The switch elements 18a and 18d are turned on when the write operation or the power save operation is finished, i.e. in response to the trailing edge of the signal WG or PS.

Figure 6A:
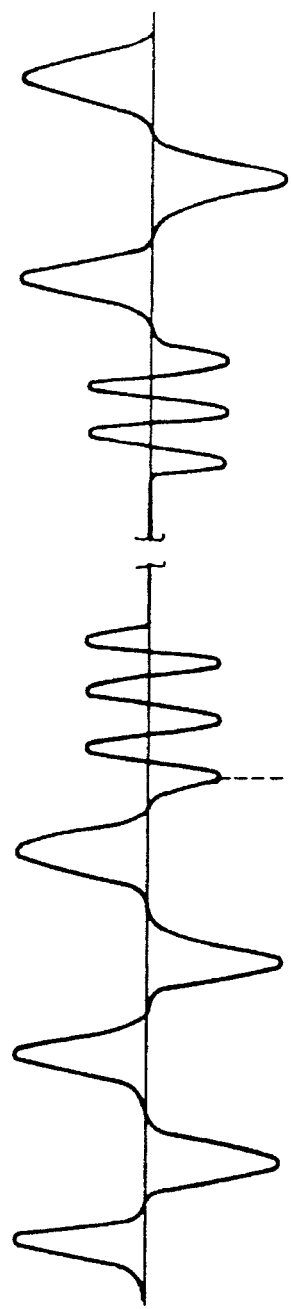
FIGS. 6a, 6b and 6c are timing charts for explaining the operation of the data reproducing circuit shown in FIG. 3.
Figure 6B:
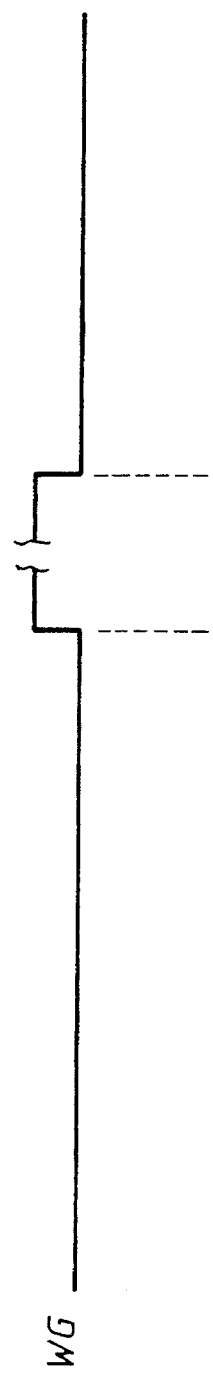
Figure 6C:
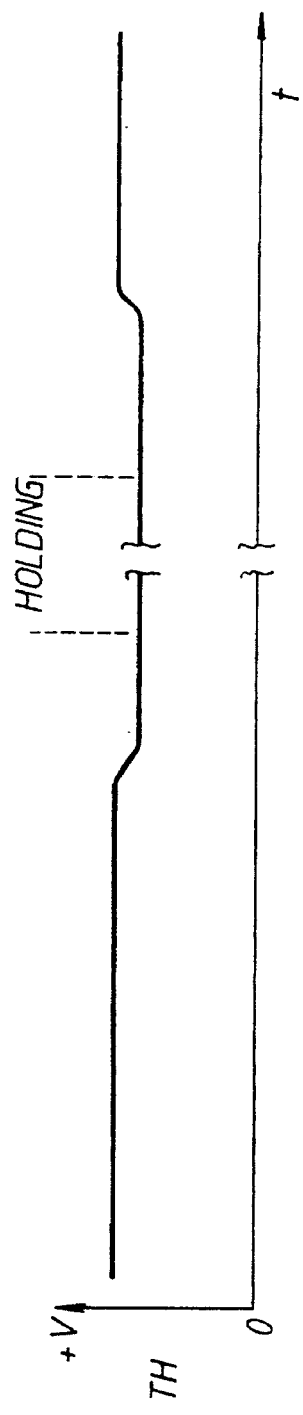

Accordingly, in the data reproducing operation immediately before the write operation, a value (the charging level of the capacitor 18c) obtained by smoothing the full wave rectification signal FWR is kept. That is, as shown in FIG. 6c, the value of the signal TH (the charging level of the capacitor 18c) immediately before the write operation starts is held in synchronism with the leading edge of the write gate signal WG.

If the data reproducing operation is shifted to the power save operation, the integrating circuit 18 similarly holds the charging level of the capacitor 18c immediately before the power saving mode starts, in response to the leading edge of the power save signal PS that is output from the CPU (the control circuit 9) of HDD according to a command from a host computer.

Thus, according to the present invention, when the data reproducing operation is shifted to either the write operation or the power save operation, the value of the signal TH generated by the integrating circuit 18 immediately before the operations start is held in the integrating circuit 18 at a substantially high level without the drop to the bias voltage. Therefore, if the data reproducing operation is resumed after completing the write operation or the power save operation, the integrating circuit 18 outputs a threshold signal TH at a proper level immediately on the basis of the held integrated value. In the prior art circuit, electric charges held by the capacitor 18c goes away during the write operation and the power save operation so that the voltage level of the capacitor 18c gets to the bias voltage. When the read operation is resumed from those operations, there is a delay for the level of the TH signal to become a proper level (which is shown by dotted lines in FIG. 7b). Thus, as shown by dot-and-dash lines in FIG. 7b, the signal TH of relatively low level is generated by the integrating circuit 8 during a transitional period. The window generating circuit 5b generates false window pulses (shown by dotted lines in FIG. 7a) by comparing the signal RS (the output of LPF 4) with the low level TH signal. The pulse generating circuit 5c generates noise pulses (NPs) shown by dotted lines in FIG. 7d at the zero crossing points of the signal DS when the false window pulses exist.

In contrast, in the present invention, even when the data reproducing operation is started immediately after the write operation or the power save operation, the integrating circuit 18 outputs the threshold signal TH at a proper level without delay due to the integrating time constant of the integrating circuit 18. Thus, the binarization circuit 5 is able to generate an accurate window pulse based on the threshold signal TH of proper level and as a result, is able to output an accurate read data pulse RD.

As described above in detail, according to the present invention, it is possible to generate the threshold signal of proper level stably even immediately after the write operation or the power save operation in the data reproducing system which outputs read data pulses from the binarization circuit using the threshold signal generated by the integrating circuit. Therefore, it becomes always possible to get the proper read data pulses from the binarization circuit and to achieve the positive data reproducing operation.

What is claimed is:

1. A magnetic recording/reproducing apparatus for reproducing data recorded on a recording medium based on a read signal generated by a head, comprising:

filter means for restricting the frequency range of the read signal and for allowing a low frequency read signal to pass through it;

full wave rectifying means for receiving said low frequency read signal and for generating a rectified signal, in response thereto, said rectified signal being a full wave rectification of said low frequency read signal;

integrating means for generating a threshold signal of said low frequency read signal by integrating said rectified signal;

binarization means for generating read data pulses based on said threshold signal said low frequency read signal; and switch means, interposed between said integrating means and said full wave rectifying means, and between said integrating means and said binarization means, for causing said integrating means to hold said rectified signal.

2. The apparatus according to claim 1, wherein the binarization means includes means for generating a window according to the threshold signal output from the integrating means and means for generating read data pulses generated based on the zero crossing point of the differentiated signal obtained by differentiating the read signal output from the filter means and the window.

3. The apparatus according to claim 1, wherein said switch means causes said integrating means to hold said rectified signal at a time immediately prior to the start of an operation other than a data reproducing operation.

4. The apparatus according to claim 3, wherein the operation other than the data reproducing operation includes a data recording operation on the recording medium.

5. The apparatus according to claim 3, wherein the operation other than the data reproducing operation includes a power save operation.

6. The apparatus according to claim 1, wherein said switch means further comprises a first switch interposed between said integrating means and said full wave rectifying means, and a second switch interposed between said integrating means and said binarization means.

7. The apparatus according to claim 6, wherein said first and second switches are switched in unison.

8. A data reproducing method for a magnetic recording/reproducing apparatus for reproducing data signals recorded on a recording medium based on a read signal read by a head, the method comprising the steps of:

restricting the frequency range of the read signal and extracting a low frequency read signal therefrom;

rectifying the extracted low frequency read signal to generate a full wave rectified signal;

generating a threshold signal based on an integrated value obtained by integrating the full wave rectified signal and holding said integrated value at a time immediately prior to the start of an operation other than the data reproducing operation;

differentiating the extracted low frequency read signal and outputting the differentiated signal; and generating said read data pulses based on the threshold signal and the differentiated signal.

9. The method according to claim 8, wherein said operation other than the data reproducing operation includes the operation for recording data on the recording medium.

10. The method according to claim 8, wherein said operation other than the data reproducing operation includes the power save operation.

11. The method according to claim 8, wherein the step for generating the read data pulses includes generating the window signal based on the extracted low frequency read signal and the threshold signal, and the read data pulses are generated based on the window signal generated in the window signal generating step and the zero crossing point of the differentiated signal.

* * * * *